United States Patent [19]
Yagi et al.

[11] Patent Number: 5,634,077
[45] Date of Patent: May 27, 1997

[54] INFORMATION PROCESSING SYSTEM WITH CONTROL METHODS AND APPARATUS FOR INFORMATION STORAGE AND INTERRUPT REQUEST HANDLING SCHEME

[75] Inventors: Takayuki Yagi, Tokyo; Yoichiro Takeuchi, Saitama-ken, both of Japan

[73] Assignee: Kabushiki Kaisha Toshiba, Kanagawa-ken, Japan

[21] Appl. No.: 370,236

[22] Filed: Jan. 9, 1995

Related U.S. Application Data

[63] Continuation of Ser. No. 925,929, Aug. 7, 1992, abandoned.

[30] Foreign Application Priority Data

Aug. 12, 1991 [JP] Japan .................... 3-201788

[51] Int. Cl.$^6$ ............................ G06F 13/24; G06F 12/02
[52] U.S. Cl. .................... 395/868; 395/492; 395/486; 395/733
[58] Field of Search .............................. 364/200 MS File, 364/900 MS File; 395/401, 486, 492, 775, 487, 733, 868

[56] References Cited

U.S. PATENT DOCUMENTS

| | | | |
|---|---|---|---|
| 4,087,852 | 5/1978 | Campbell et al. | 395/375 |
| 4,296,470 | 10/1981 | Fairchild et al. | 395/742 |
| 4,495,571 | 1/1985 | Staplin, Jr. et al. | 395/293 |
| 4,685,125 | 8/1987 | Zave | 379/96 |
| 4,745,547 | 5/1988 | Buchholz et al. | 395/800 |
| 4,768,146 | 8/1988 | Nagashima et al. | 395/417 |
| 4,907,150 | 3/1990 | Arroyo et al. | 395/182.22 |
| 4,980,850 | 12/1990 | Morgan | 395/497.03 |
| 4,989,113 | 1/1991 | Hull, Jr. et al. | 395/842 |
| 5,091,846 | 2/1992 | Sachs et al. | 395/250 |
| 5,142,635 | 8/1992 | Saini | 395/375 |
| 5,175,853 | 12/1992 | Kardach et al. | 395/650 |
| 5,214,695 | 5/1993 | Arnold et al. | 380/4 |
| 5,287,471 | 2/1994 | Katayose et al. | 395/842 |

OTHER PUBLICATIONS

M. Morris Mano, Computer System Architecture, 2nd Edition, pp. 403–473, 1982.

*Primary Examiner*—Matthew M. Kim
*Attorney, Agent, or Firm*—Finnegan, Henderson, Farabow, Garrett & Dunner, L.L.P.

[57] ABSTRACT

An information processing system including an operational processing system having a plurality of registers, for executing an operational processing. A storage system having a memory unit, connected to the operational processing system, stores information stored in the registers into an information region in the memory unit. A memory information storing unit stores information on a stored information region within the information region. The stored information region has already stored information. A input unit inputs the information stored in the registers into the memory unit. And a control unit controls the input unit to control inputting the information stored in the registers into the memory unit according to the information on the stored information region of the memory unit.

4 Claims, 3 Drawing Sheets

INFORMATION PROCESSING SYSTEM WITH CONTROL METHODS AND APPARATUS FOR INFORMATION STORAGE AND INTERRUPT REQUEST HANDLING SCHEME

This application is a continuation, of application Ser. No. 07/925,929, filed Aug. 7, 1992, now abandoned.

BACKGROUND OF THE INVENTION

This invention relates to an information processing system and more particularly to an information processing system provided with an improved memory system.

Currently, computers sometimes interrupt a program which is executing processing before the completion of that program, and give precedence to the execution of the next program. When returning to the interrupted program later, the required information, such as the address of the command which indicates from which command to re-execute, is stored in a stack memory.

In prior art, when controlling this stack memory, information for the address which indicates the head of the stack memory and the address which indicated the end of the stack memory is provided, and the information in the register during execution by the operational processing unit is stored in the stack memory.

There is a problem in that, when interruption processing occurred during the storage in the stack memory of the information in the register, if the interruption processing is executed by interrupting the storage of the register information in the stack memory, the register information is destroyed.

For this reason, the interruption processing operation is executed after completion of the storage of the register information in the stack memory.

In recent years, with the technological advances in computers, the number of registers has increased, and therefore a long time is required for the storage in the stack memory of all the register information.

Therefore, since interruption processing operations are made to wait for these storage operations, processing in the operational processing unit could not be executed speedily and efficiently.

Thus there is the problem that, particularly in the case of computers with large numbers of registers, when interruption processing is urgently required, this resulted in a reduction of information processing efficiency or processing performance due to operational delays.

SUMMARY OF THE INVENTION

It is an object to improve the efficiency of information processing in an information processing system.

Another object is to make it possible to improve information storing processing in an information processing system.

In order to achieve the above objects, according to one aspect of the invention, an information processing system is provided, the information processing system includes an operational processing system having a plurality of registers and a storage system connected to the operational processing system, for storing information stored in the registers, the storage system comprising memory element having an information region, for storing the information stored in the registers into the information region; a memory information storing element for storing information on a stored information region within the information region, the stored information region storing information; an input element for inputting the information stored in the registers into the memory element; and control element for controlling the input element to control inputting the information stored in the registers into the memory element according to the information on the stored information region of the memory element.

According to another aspect of the invention, a method of controlling an information processing system is provided. The method of controlling an information processing system including an operational processing system having a plurality of registers, for executing an operational processing and a storage system connected to the operational processing system, for storing information stored in the registers into an information region within the storage system, comprising the steps of; storing the information stored in the registers into the information region; storing information on a stored information region within the information region, the stored information region storing information; inputting the information stored in the registers into the information region; and controlling input of the information stored in the registers into the information region according to the information on the stored information region.

DETAILED DESCRIPTION OF THE PREFERRED EMBODIMENTS

Figure 1:
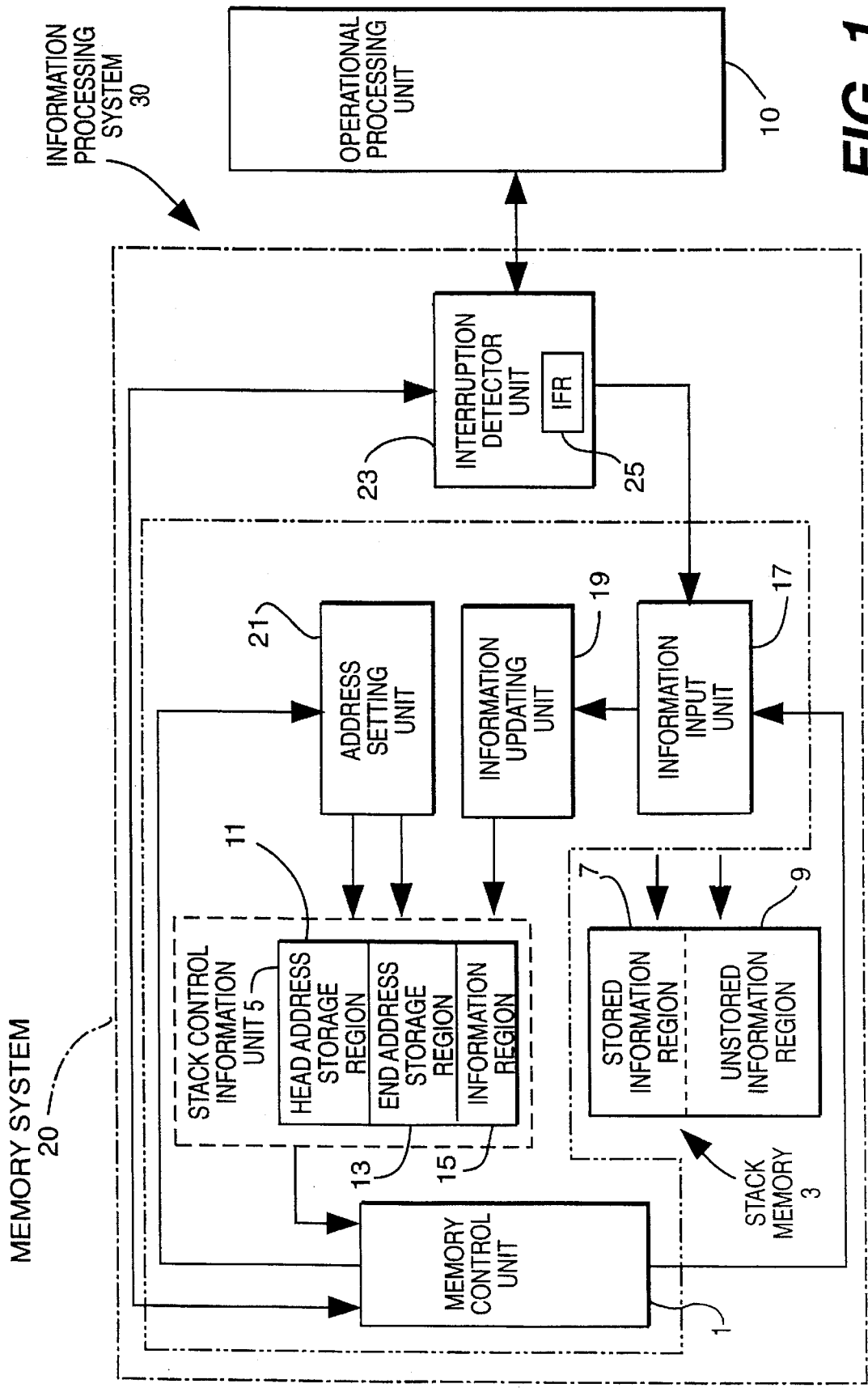
FIG. 1 is a block diagram showing an information processing system according to an embodiment of this invention.

The following is a description of an embodiment of this invention with reference to the drawings. FIG. 1 is a block diagram of the information processing system according to the invention. Operational processing unit 10 is connected to memory system 20 to form information processing system 30. In memory system 20, stack memory 3 has stored information region 7 in which information is already stored and unstored information region 9 in which information is not stored. Stack control information unit 5 is provided with head address storage region 11, end address storage region 13 and information region 15 which stores address information related to stored information region 7. When information is stored in unstored information region 9 of stack memory 3, the stored information in information region 15 is updated by information updating unit 19 (described later).

Information input unit 17 inputs units of information to be stored in unstored information region 9 of stack memory 3, for instance the relevant register information for every register. After this storage, it outputs a signal to information updating unit 19. When the signal is inputted from information input unit 17, information updating unit 19 updates the stored information in information region 15 of stack control information unit 5.

Address setting units 21 writes head address and end address of stack memory 3 in storage regions 11 and 13 by respective commands from memory control unit 1.

Interruption detector unit 23 is provided with interruption flag register (hereinafter, 'IFR') 25, and detects the presence or absence of interruption processing requests.

Also, when interruption detector unit 23 detects an interruption processing request, memory control unit 1 stops the operation of information input unit 17. Then, after the completion of the interruption processing, memory control unit 1 once more instructs information input unit 17 to store register information in stack memory 3.

Figure 2B:
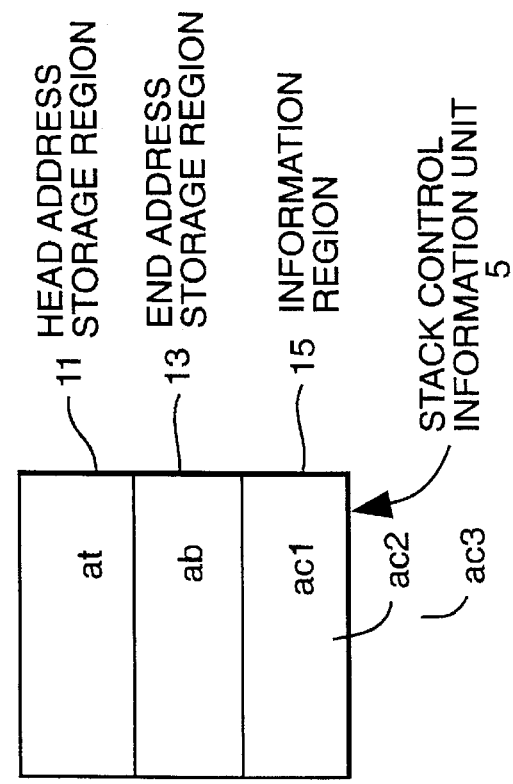
FIG. 2(a) and FIG. 2(b) are diagrams illustrating operations of this invention.
Figure 2A:
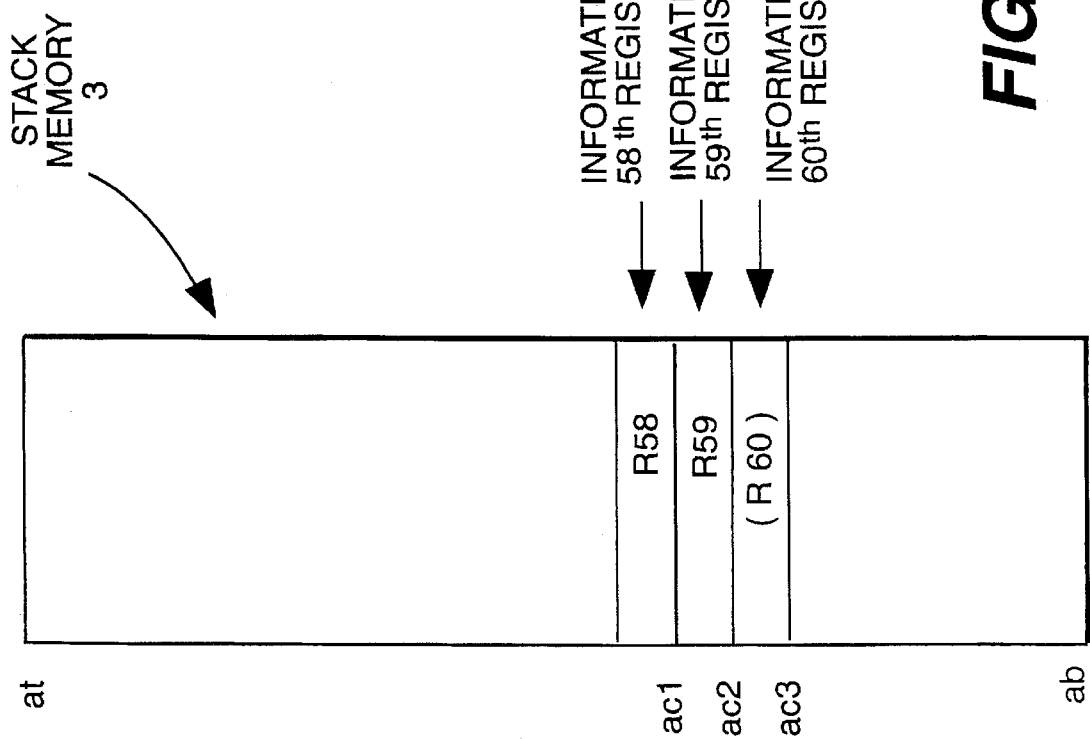

FIG. 2(a) and FIG. 2(b) are diagrams illustrating the operations of writing information in stack memory 3.

Address setting unit 21 sets head address $a_r$ and address $a_b$ and address information a on the stored information region in stack control information unit 5.

When the information in the 58th register (R58) is stored in stack memory 3, the address information of stored information region 7 in stack control information unit 5 is updated to $a_{c1}$, by information updating unit 19.

Next, when the information in the 59th register (R59) is stored in stack memory 3, the address information is updated to $a_{c2}$. Moreover, if interruption processing occurs while the information in the 60th register (R60) is being stored, memory control unit 1 stops the operation of information input unit 17. After completion of the interruption processing, interruption detector unit 23 outputs a signal to memory control unit 1. By this means, memory control unit 1 refers to the address information on the stored information and confirms that information up to and including R59 has been stored. Then, the storage in stack memory 3 of the information in the 60th register (R60) commences. After this storage, the address information on the stored information is updated to $a_{c3}$.

Figure 3:
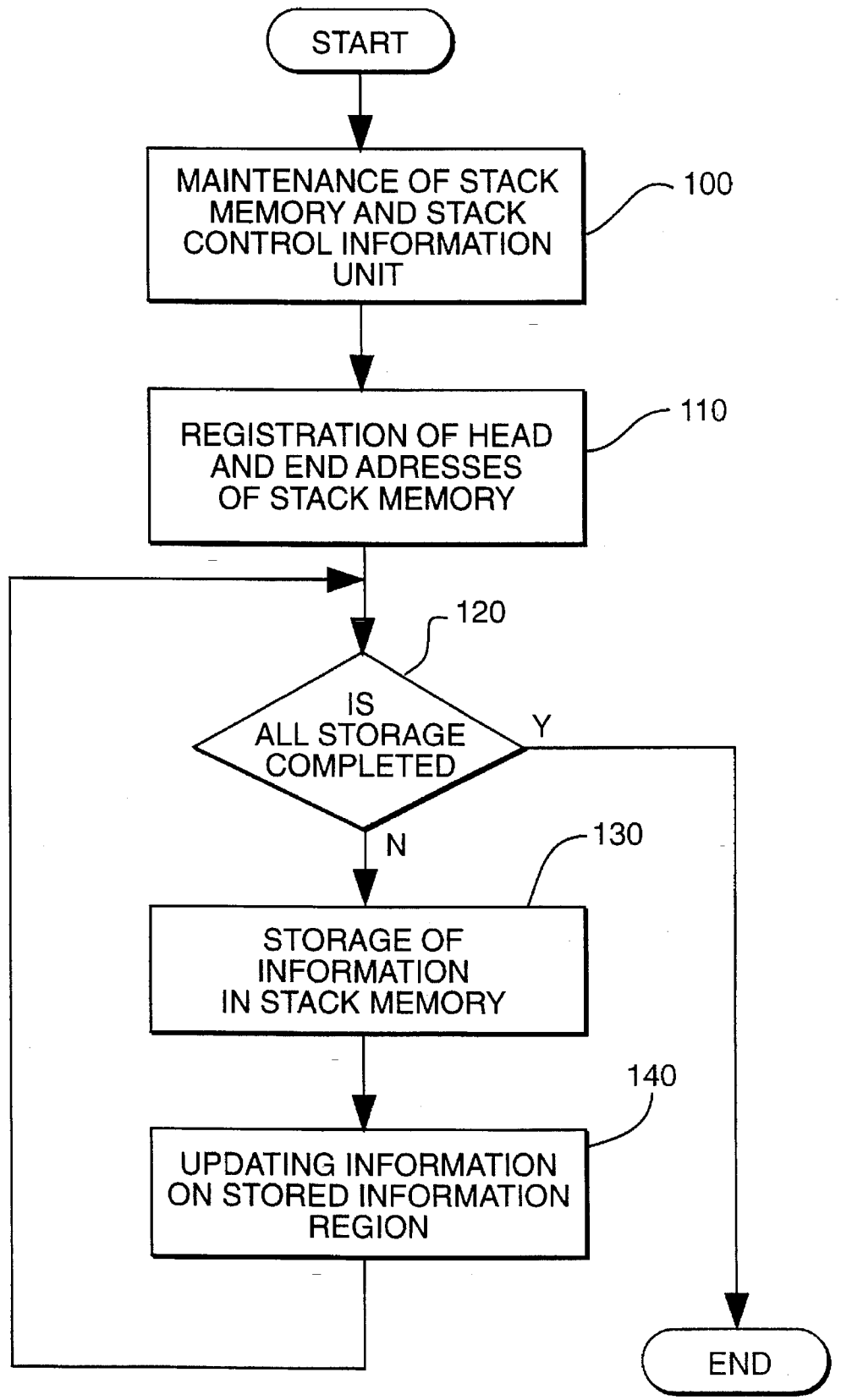
FIG. 3 is a flow-chart illustrating the operations of this invention.

The following is a description of the operation of this invention with reference to the flow-chart shown in FIG. 3.

After starting up the system, memory control unit 1 maintains stack memory 3 and stack control information unit 5 in the memory system. When stack control information unit 5 is maintained, address setting unit 21 registers the head address and end address of the stack memory in the specified regions of stack control information unit 5 through memory control unit 1 (Steps 100–110).

Information input unit 17, which stores the register information in stack 3, stores the register information of every relevant register unit. In Step 120, if storage of all the register information is completed, the process ends. On the other hand, if the storage of the information in all the registers is not completed, information input unit 17 stores the information in the 59th register in unstored information region 9 in stack memory 3 (Step 130). After this storage, when a signal is outputted from information input unit 17 to information updating unit 19, information updating unit 19 updates the address information on the stored information in stack control information unit 5 from $a_{c1}$ to $a_{c2}$, and the program returns to Step 120 (Step 140).

In Steps 120–140, if interruption processing occurs, interruption detector unit 23 detects the interruption processing request and the operation of information input unit 17 stops. When the interruption processing is completed, interruption detection unit 23 outputs a signal to memory control unit 1. Memory control unit 1 refers to the address information on the stored information in stack control information unit 5 and, since that the address information on the stored information is $a_{c2}$, stores the information in the 60th register (R60) in unstored information region 9 of stack memory 3.

By this means, even if an interruption processing request is generated during the input of information to stack memory 3, processing can be executed without delaying the relevant interruption processing. Thus, the processing efficiency of the operational processing unit can be improved.

In this invention, as described above, by making it possible to discriminate the stored information region of the stack memory, even if interruption processing is generated, that interruption processing can be speedily processed.

What is claimed is:

1. An information processing system including an operational processing system having a plurality of registers for executing an operational processing, and a storage system connected to the operational processing system for storing information stored in the registers, the storage system comprising:

interruption processing detector means for detecting whether an execution of interruption processing is requested in the operational processing system;

memory means having an information storing region organized in a stack structure, for storing the information stored in the registers into the information storing region;

input means for inputting the information stored in the registers into the information storing region of the memory means;

address data storing means for storing address data for a stored information region within the information storing region, wherein the stored information region stores the information from the registers and the address data includes an address of the register most recently stored into the information storing region; and control means for controlling the input means to control inputting the information stored in the registers into the information storing region of the memory means according to the address data for the stored information region within the information storing region, and to suspend inputting the information stored in the registers into the information storing region prior to the completion of the storage of the information stored in all of the plurality of registers into the information storing region, when a request for the execution of interruption processing is detected by the interruption processing detector means.

2. The information processing system of claim 1, wherein the address data storing means includes information update means for updating the address data for the stored information region within the information storing region of the memory means.

3. A method of controlling an information processing system including an operational processing system having a plurality of registers for executing an operational processing and a storage system connected to the operational processing system for storing information stored in the registers into an information storing region within the storage system, the method comprising the steps of;

storing the information stored in the registers into the information storing region;

detecting whether an execution of interruption processing is requested in the operational processing system;

suspending the step of storing the information stored in the registers into the information storing region prior to the completion of the storage of the information stored in all of the plurality of registers into the information storing region, when a request for the execution of interruption processing is detected;

storing address data for a stored information region within the information storing region, where the stored information region stores the information from the registers and the address data includes an address of the register most recently stored into the information storing region;

resuming storing, based on the address data, the information stored in the registers into the information storing region.

4. The method of claim 3, wherein the step of storing the address data for the stored information region includes a step of updating the address data for the stored information region.

* * * * *